United States Patent
Xie

(10) Patent No.: US 7,376,353 B2
(45) Date of Patent: May 20, 2008

(54) METHOD AND APPARATUS FOR DISPERSION MANAGEMENT IN OPTICAL MESH NETWORKS

(75) Inventor: Chongjin Xie, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 494 days.

(21) Appl. No.: 11/018,458

(22) Filed: Dec. 21, 2004

(65) Prior Publication Data

US 2006/0133817 A1    Jun. 22, 2006

(51) Int. Cl.
*H04B 10/12* (2006.01)
*H04B 10/00* (2006.01)

(52) U.S. Cl. .......................... 398/147; 398/161
(58) Field of Classification Search ............... 398/147, 398/161, 79, 81, 83, 58
See application file for complete search history.

(56) References Cited

U.S. PATENT DOCUMENTS

| | | | |
|---|---|---|---|
| 6,920,261 B2 * | 7/2005 | Inada et al. ................... | 385/24 |
| 2002/0141048 A1 * | 10/2002 | Spock et al. ................ | 359/349 |
| 2002/0186432 A1 * | 12/2002 | Roorda et al. .............. | 359/128 |
| 2004/0126114 A1 | 7/2004 | Liu et al. ...................... | 398/81 |

OTHER PUBLICATIONS

U.S. Appl. No. 10/869,431, filed Jun. 1, 2004, Fishman et al.
G. Bellotti et al, "Cross-Phase Modulation Suppressor For Multispan Dispersion-Managed WDM Transmission", *IEEE Photonics Technology Letters*, vol. 12, No. 6, Jun. 2000, pp. 726-728.
S. Banerjee et al., "Doubly Periodic Dispersion Maps For DWDM Transmission at 10 GB/s and 40 Gb/s", *ECOC'04*, paper We4.P.096, Stockholm, Sweden, 2004.
D. J. Moss et al., Multichannel Tunable Dispersion Compensation Using All-Pass Multicavity Etalons, *Technical Digest of the Optical Fiber Communication Conference OFC 2002*, paper TuT2, 2002, pp. 132-133.
M. Shirasaki, Chromatic-Dispersion Compensator Using Virtually imaged Phased Array, *IEEE Photonics Technology Letters*, vol. 9, No. 12, Dec. 1997, pp. 1598-1600.
C. R. Doerr et al., "Multichannel Integrated Tunable Dispersion Compensator Employing A Thermooptic Lens", *Technical Digest of the Optical Fiber Communication Conference OFC '02*, paper FA6-1, 2002.
C. K. Madsen et al., "Optical All-Pass Filters For Phase Response Design With Applications for Dispersion Compensation", *IEEE Photonics Technology Letters*, vol. 10, No. 7, Jul. 1998, pp. 994-996.

* cited by examiner

*Primary Examiner*—Jason Chan
*Assistant Examiner*—Quan-Zhen Wang

(57) ABSTRACT

A method and apparatus for dispersion management in hybrid data rate long haul mesh networks are provided. The apparatus comprises a dispersion compensator for fully compensating the residual dispersion of a fiber link in the mesh network. A de-interleaver is coupled to the dispersion compensator for de-interleaving odd and even channels of wavelength division multiplexed (WDM) signals transmitted across the fiber link. A delay device is coupled to the de-interleaver for introducing a delay to the odd channels or the even channels of the WDM signals to decorrelate the odd and even channels and substantially reduce inter-channel cross-phase modulation.

5 Claims, 7 Drawing Sheets

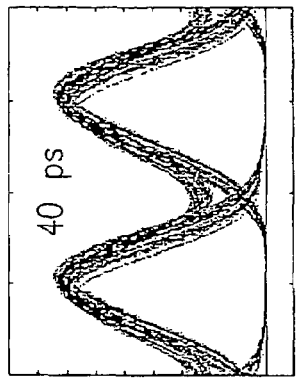
FIG. 5A
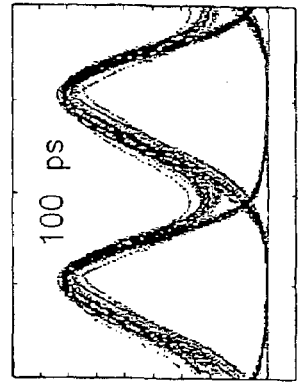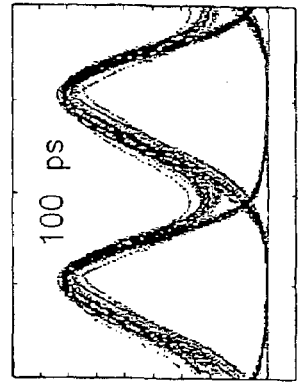
FIG. 5B
FIG. 5C
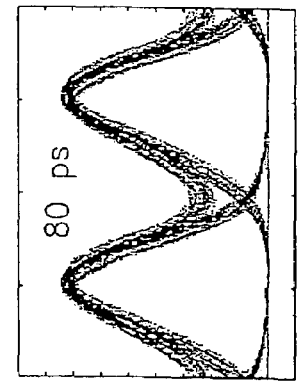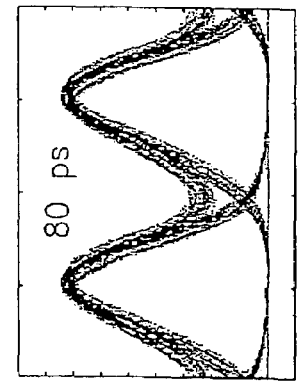
FIG. 5D
FIG. 5E
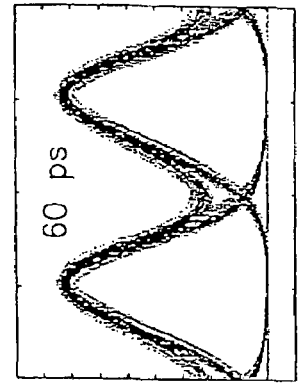
FIG. 5F

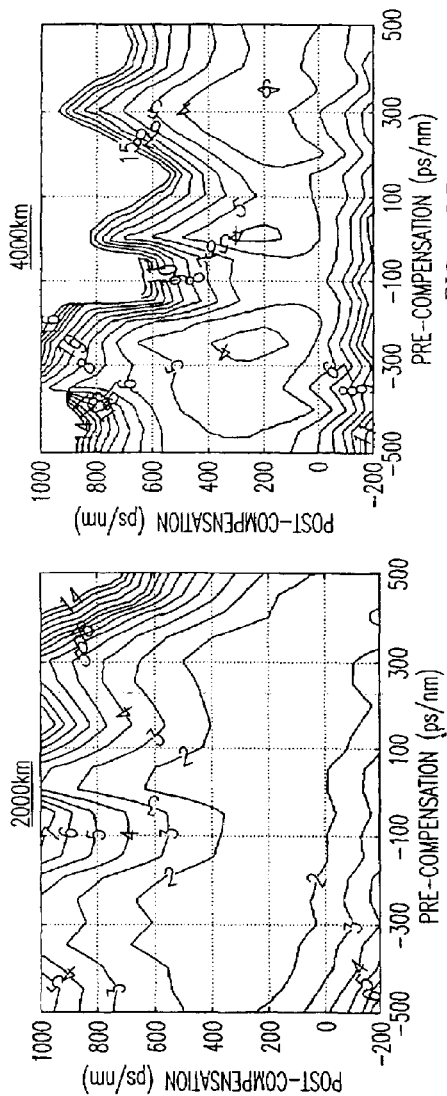

METHOD AND APPARATUS FOR DISPERSION MANAGEMENT IN OPTICAL MESH NETWORKS

TECHNICAL FIELD

The present invention relates generally to optical networks, and more particularly to methods and apparatus for dispersion management in hybrid data rate long haul mesh networks.

BACKGROUND OF THE INVENTION

Next generation ultra-long haul optical networks will include hybrid data rate dense wavelength division multiplexing (DWDM) optical mesh networks that support, for example, both 10-Gb/s and 40-Gb/s signal transmission. In such mesh networks 10-Gb/s and 40-Gb/s signals are transmitted in the same transmission fiber and can originate and terminate anywhere in the network.

To make these hybrid data rate mesh networks practicable and cost-effective, a scalable dispersion management scheme or dispersion map is desirable. This requires pre-, post- and in-line dispersion compensation to be independent of both transmission distance and data rate. Such requirements pose significant design challenges since different dispersion management requirements arise for different data rates. For example, optimal performance for 10-Gb/s signal transmission usually requires non-zero residual dispersion in transmission spans, links and paths, while 40-Gb/s signal transmission usually requires zero residual dispersion.

Prior art solutions have proposed dispersion maps for point-to-point single data rate optical transmission systems. It has been shown that for 40-Gb/s systems employing a singly periodic dispersion map, the required pre- and post-dispersion compensation is dependent on transmission distance. Thus, if a singly periodic dispersion map is employed in a 40-Gb/s mesh network, tunable dispersion compensators (TDCs) with large tuning ranges are necessary in receivers or in transmitters to accommodate signals traveling different distances in the mesh network. This can significantly complicate the system control and increase the system cost.

One prior art solution to this problem proposes the use of a doubly periodic dispersion map, which fully compensates the residual dispersion in each link. This reduces the dependence of pre- and post-dispersion compensation on distance for 40-Gb/s transmissions. However, for 10-Gb/s transmission, which requires non-zero residual dispersion, doubly periodic dispersion maps with zero residual dispersion can lead to unacceptable inter-channel cross-phase modulation (XPM).

Prior art solutions for addressing inter-channel XPM have proposed demultiplexing WDM signals in each span of a transmission link to introduce variable delays to each channel of the WDM signal. These channel-based solutions, however, require large numbers of tunable delay devices to force destructive interference between all channels in every span of every link of a network. Such solutions are not cost effective, and are accordingly impractical.

SUMMARY OF THE INVENTION

The present invention provides methods and apparatus for dispersion management in hybrid data rate (e.g. 10-Gb/s and 40-Gb/s) long haul mesh networks. The methods and apparatus provide cost effective solutions that allow for bit-rate independent and distance-independent pre- and post-dispersion compensation, while significantly reducing inter-channel XPM.

In one preferred embodiment of the invention a reconfigurable optical add-drop multiplexer (ROADM) apparatus is provided. The apparatus comprises a dispersion compensator for fully compensating the residual dispersion of a fiber link in a long haul mesh network. A de-interleaver is coupled to the dispersion compensator for de-interleaving odd and even channels of wavelength division multiplexed (WDM) signals transmitted across the fiber link. A delay device is coupled to the de-interleaver for introducing a delay to the odd channels or to the even channels of the WDM signals to decorrelate the odd and even channels to substantially reduce inter-channel cross-phase modulation.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings:

FIGS. 5a-f are the simulated eye diagrams for 10-Gb/s transmissions over 4000 km using various time delays between odd and even channels;

FIGS. 6a-d show the EOP of 10-Gb/s signal transmissions versus the pre- and post-dispersion compensations at two different distances without and with 80 ps time delay between odd and even channels;

DETAILED DESCRIPTION

Reference herein to "one embodiment" or "an embodiment" is intended to mean that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
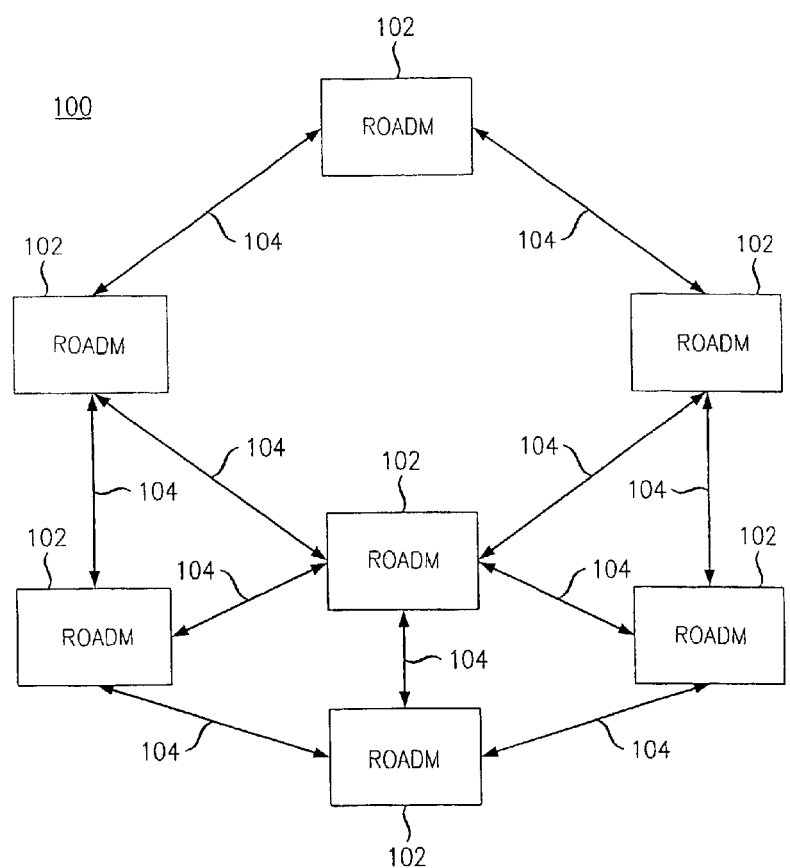
FIG. 1 shows a block diagram of a WDM optical mesh network, in which the present invention can be practiced.

FIG. 1 shows a block diagram of an exemplary optical mesh network 100, in which the present invention can be practiced. The network 100 has a plurality of nodes 102 coupled by bi-directional links 104, where each of the nodes is adapted to process optical signals carried via the links 104. The nodes 102 may comprise reconfigurable optical add-drop-multiplexers (ROADMs) for routing optical signals between adjacent nodes 102, extracting (i.e., dropping) from network traffic optical signals designated for local receivers, and inserting (i.e., adding) into the network traffic optical signals generated by local transmitters. Each link 104 may include one or more optical fibers, optical dispersion compensators (not shown), optical amplifiers (not shown), signal regenerators (not shown), and/or other customary components.

Figure 2:
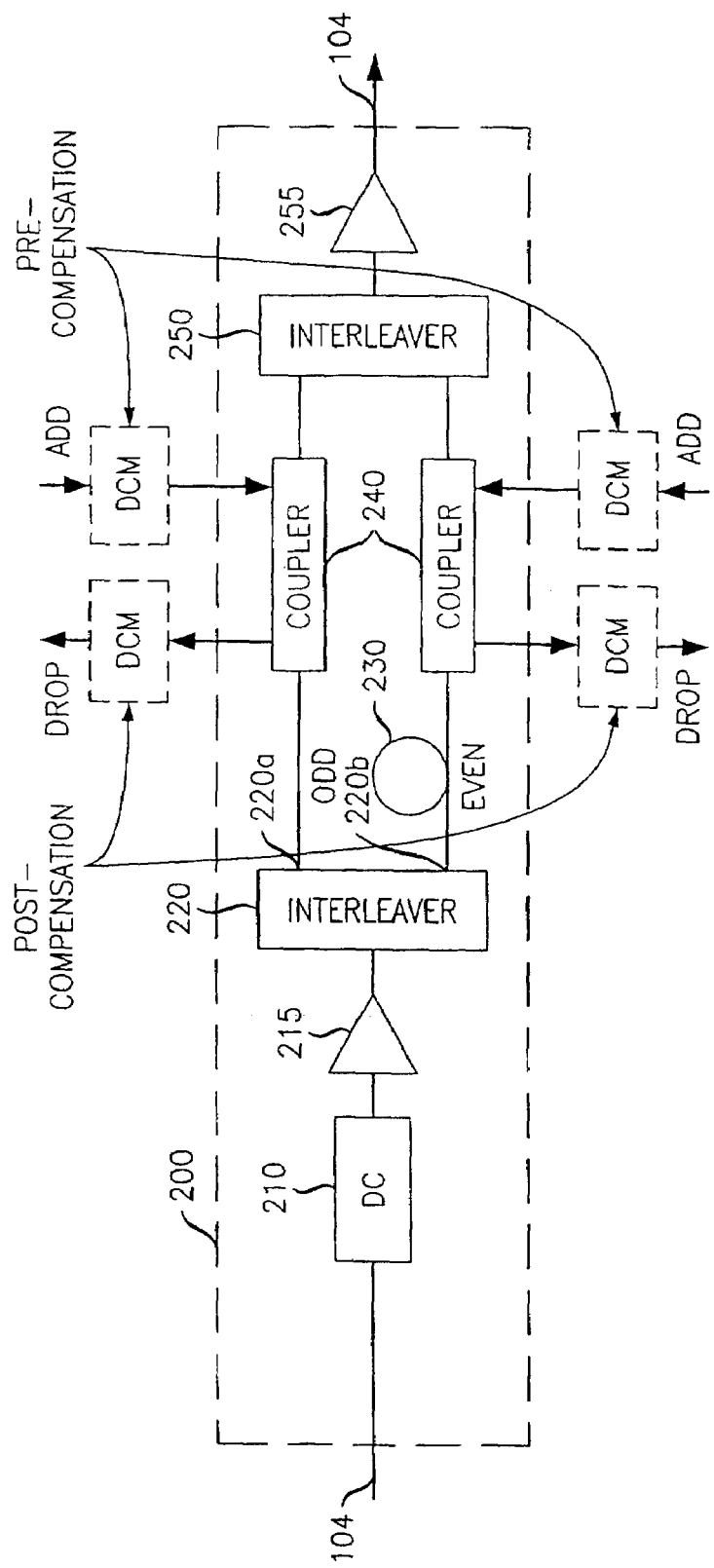
FIG. 2 is a block diagram of an apparatus according to one embodiment of the present invention.

FIG. 2 shows a block diagram of a ROADM apparatus 200 according to one embodiment of the invention, which can be employed in the network 100 of FIG. 1, and which can also be used to implement embodiments of the method of the invention.

The ROADM apparatus 200 preferably comprises a dispersion compensator 210 for "fully" compensating the residual dispersion of a fiber link (e.g. link 104). As used herein, and as show in FIG. 3 (discussed below), the residual dispersion of a fiber link (i.e. residual dispersion per link (RDPL)) refers to the residual dispersion of a link between neighboring nodes of a network. It is understood that some dispersion compensator devices may not provide perfect compensation of the RDPL for every channel of a WDM signal. Accordingly, the dispersion compensator is preferably selected to substantially provide full compensation of the RDPL for all channels of a WDM signal (i.e. "fully compensate" the RDPL).

The dispersion compensator 210 preferably comprises dispersion compensating fiber (DCF) or the like.

A de-interleaver 220 is preferably coupled to the dispersion compensator 210 for de-interleaving odd and even channels of WDM signals transmitted on the fiber link 104. The odd and even channels are output onto a first output port 220a and a second output port 220b, respectively.

A delay device 230 is preferably coupled to an output port 220b of the de-interleaver 220 for introducing a delay to the even channels of the WDM signal to decorrelate the odd and even channels to avoid constructive interference between odd and even channels. Those skilled in the art will appreciate that the delay device 230 can be coupled to either output (220a, 220b) of the de-interleaver 220 to introduce a delay to either the odd or even channels of WDM signals to decorrelate the odd and even channels. The delay device 230 preferably comprises a fiber jumper of a predetermined length for introducing a desired delay. The delay is preferably at least about 60 ps.

The WDM signals may include, for example, channels with a bit rate of 10-Gb/s, and channels with a bit rate of 40-Gb/s. The WDM signals may have, for example, an RZ or NRZ transmission format, and an OOK or DPSK modulation format.

Coupler devices 240 are preferably used to drop, block or add channels from or to the odd and/or even channels of the WDM signal (e.g., for distribution to local receivers). The coupler devices 240 can be any device or combination of devices for performing such dropping, blocking or adding functions.

Those skilled in the art will appreciate that one or more pre- or post-dispersion compensator(s) (e.g. DCMs shown in phantom in FIG. 3) may also be employed to respectively provide pre- or post-dispersion compensation of one or more channels added to or dropped from transmitted WDM signals. As discussed above, the pre- and post-dispersion compensation provided by the DCMs may be independent of the transmission distance traveled by signals on the dropped or added channels.

A second interleaver 250 is preferably provided to interleave the odd and even channels, and output a WDM signal for transmission across a transmission link (e.g. link 104).

One or more amplifiers (e.g. amplifiers 215, 255) may also be incorporated into the ROADM apparatus 200 to compensate for loss induced in the ROADM apparatus 200 and/or in a transmission link 104.

In one embodiment of an optical mesh network according to the invention a plurality of ROADM apparatus 200 as discussed above with reference to FIG. 2, are employed at a plurality of nodes of the mesh network (e.g. nodes 102 discussed above with reference to FIG. 1). Such a network provides an effective dispersion management solution (i.e. dispersion map) for hybrid data rate networks, which allows for distance-independent pre- and post-dispersion compensation of, for example, 40-Gb/s and 10-Gb/s signals, while significantly reducing inter-channel XPM of, for example, 10-Gb/s signals.

Figure 3:
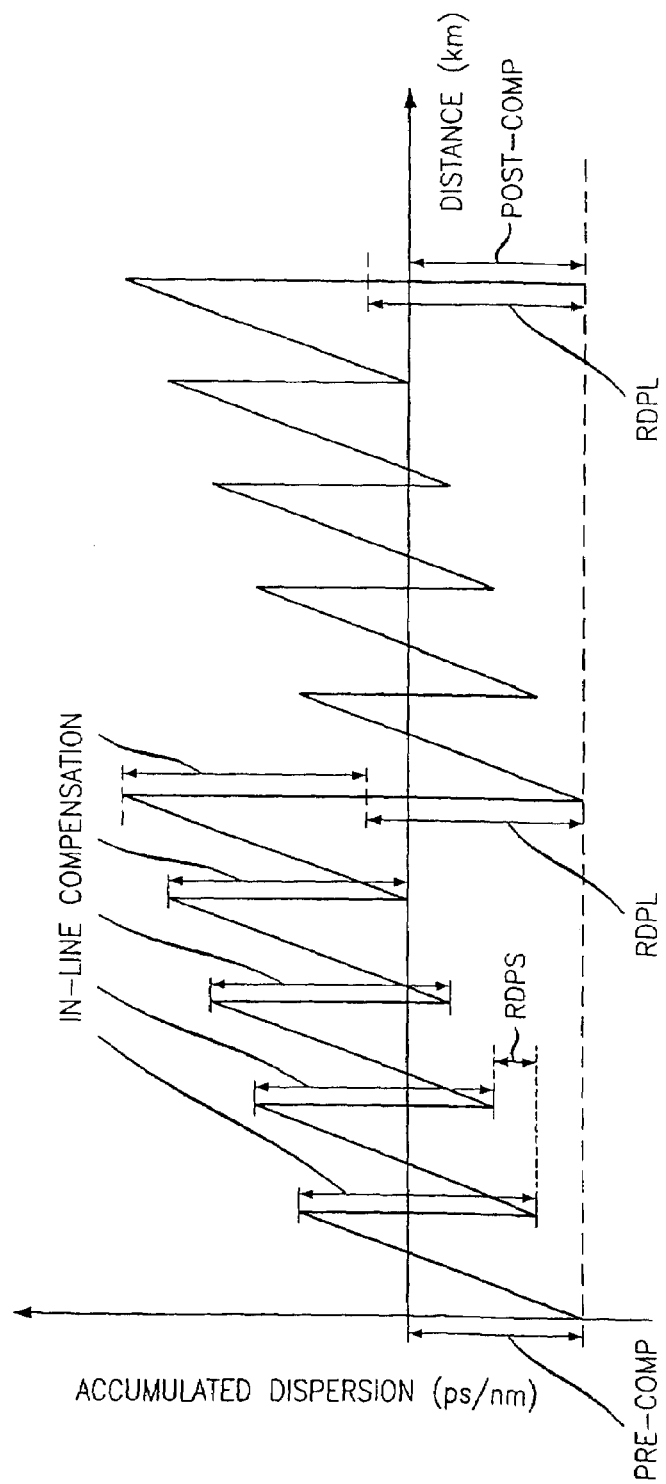
FIG. 3 is a plot graphically illustrating accumulated dispersion in a mesh network according to embodiments of the invention.

FIG. 3 is provided to illustrate the accumulated dispersion experienced by a WDM signal transmitted across a mesh network (2 links) according to embodiments of the invention. Those skilled in the art will appreciate from FIG. 3 and the above discussion of embodiments of the invention, that the RDPL is fully compensated (e.g. using dispersion compensator 210 discussed above), and that pre- and post-dispersion compensation can be distance independent (i.e. since the accumulated dispersion at each node is the same as the pre-dispersion compensation the same post-dispersion compensation can be used at each node to obtain, the same net residual dispersion (NRD) for any transmission path. NRD as used herein refers to the uncompensated dispersion experienced by a signal after transmission along a transmission path including pre- and post-dispersion compensation).

Numerical simulations were performed to confirm the effectiveness of embodiments of the present invention. Each span of links in a simulated network consisted of 100 km LEAF fiber with 6.5 ps/km.nm dispersion and DCF with 100 ps/km.nm dispersion. The residual dispersion per span (RDPS) was 30 ps/km. All Raman amplification was used with 25/75 forward/backward pumping gain (in dB) in the LEAF fiber and all backward pumping in the DCF. There were 5 spans between neighboring nodes. Both 50% return-to-zero on-off-keying (RZ-OOK) 10-Gb/s and non-return-to-zero differential-phase-shift-keying (NRZ-DPSK) 40-Gb/s channels were transmitted in the same network. The launch power of both 10-Gb/s and 40-Gb/s channels was −5 dBm and −9 dBm at the input of the LEAF fiber and the DCF, respectively.

WDM signals with 7 channel 10-Gb/s and 40-Gb/s bit rates were simulated separately, with 50 GHz and 100 GHz channel spacing for 10-Gb/s and 40-Gb/s channels, respectively $2^7$ and $2^8$ De Bruijn bit sequences (DBBS) were used for 10-Gb/s and 40-Gb/s cases, respectively.

Figure 4A:
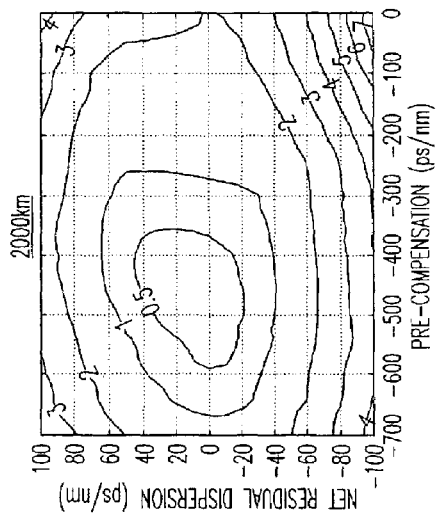
FIGS. 4a-d are plots showing the eye-opening penalty (EOP) versus the pre-dispersion compensation and net residual dispersion (NRD) for 40 Gb/s channels at two different distances using different dispersion maps.
Figure 4B:
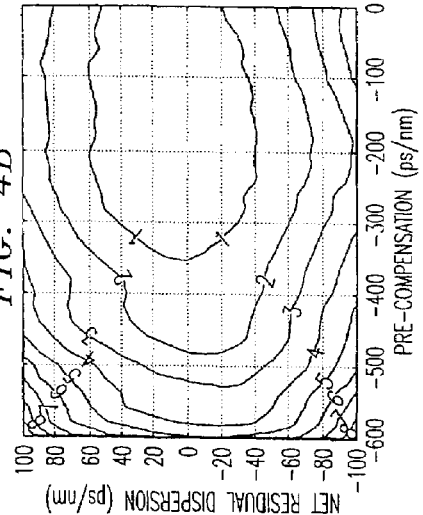
Figure 4C:
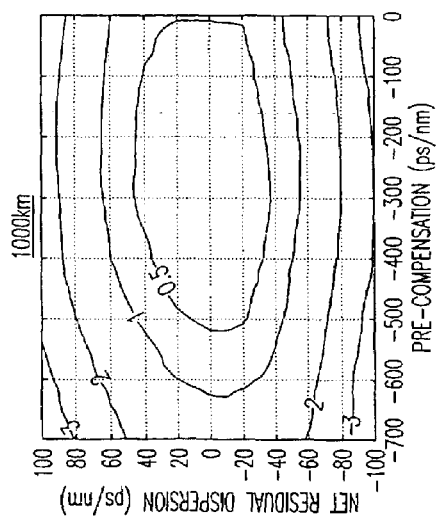
Figure 4D:
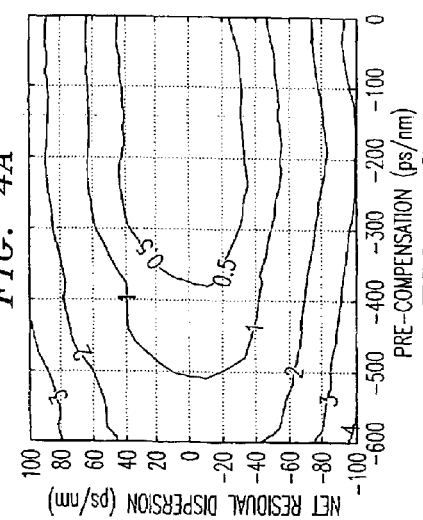

FIGS. 4a-d show the eye-opening penalty (EOP) versus the pre-dispersion compensation and NRD for 40 Gb/s channels at 1000 km (FIGS. 4a,c) and 2000 km (FIGS. 4b,d) using a singly periodic dispersion map (FIGS. 4a,b) and a dispersion map according to embodiments of the invention (FIGS. 4c,d). The EOP (in dB) is defined as the back-to-back eye-opening divided by the eye-opening after transmission. The eye-opening is defined as the height of the highest rectangle with a 20% bit period width that can be fitted into the eye-diagram.

From FIGS. 4a-d, those skilled in the art will appreciate that for the singly periodic map with non-zero RDPS, the optimum pre-dispersion compensation is distance dependent, whereas for the dispersion map according to the invention, it is substantially the same for different distances. Due to pseudo-linear transmission of 40 Gb/s signals, both the dispersion maps require zero NRD at receivers for the best performance. For the singly periodic map, since the residual dispersion of a path depends on the links experienced by signals, a distance dependent post-dispersion compensation has to be used. With a dispersion map according to the invention, substantially similar post-dispersion compensation can be used at nodes in the network, which significantly reduces the system cost associated with TDCs.

As discussed above, one problem of using a conventional doubly periodic dispersion map with zero RDPL is the large signal degradation caused by serious inter-channel XPM for 10-Gb/s channels due to the identical and constructive addition of the inter-channel XPM. Using methods and apparatus according to the invention, the signal degradation due to XPM can be substantially reduced.

FIGS. 5a-f show the eye diagrams of 10-Gb/s signal transmission over 4000 km using a dispersion map according to embodiments of the invention with different time delay values between odd and even channels at every ROADM. Those skilled in the art will appreciate from FIGS. 5a-f that by introducing a certain amount of time delay between odd and even channels, the inter-channel XPM for 10-Gb/s signals can be significantly suppressed. When there is no time delay (FIG. 5a), the inter-channel XPM induced timing jitter almost closes the eye-diagram by half. By introducing more than about 60 ps time delay (e.g. corresponding to about 1.2 cm long fiber) between odd and even channels (FIG. 5d), the timing jitter can be substantially suppressed. This can be realized by using, for example, different length fiber jumpers in a ROADM (e.g. larger than about 1.2 cm difference) for odd and even channels.

The use of the same pre- and post-compensation for both 10-Gb/s and 40-Gb/s channels was also investigated. FIGS. 6a-d show the EOP of 10-Gb/s signals versus pre- and post-dispersion compensation at 2000 km (FIGS. 6a,c) and 4000 km (FIGS. 6b,d) using a conventional doubly periodic dispersion map (FIGS. 6a,b) and dispersion map according to embodiments of the invention with 80 ps time delay between odd and even channels at each ROADM (FIGS. 6c,d).

It can be understood by those skilled in the art from FIGS. 6a-d that the conventional doubly periodic map causes very serious inter-channel XPM for 10-Gb/s channels. However, by introducing a certain amount of time delay between odd and even channels at each ROADM, the inter-channel XPM can be significantly suppressed.

It will also be appreciated from FIGS. 4 and 6 that an optimum pre- (and post-) dispersion compensation of 10-Gb/s channels is close to that of 40-Gb/s channels using a dispersion map according to embodiments of the invention.

Figure 7:
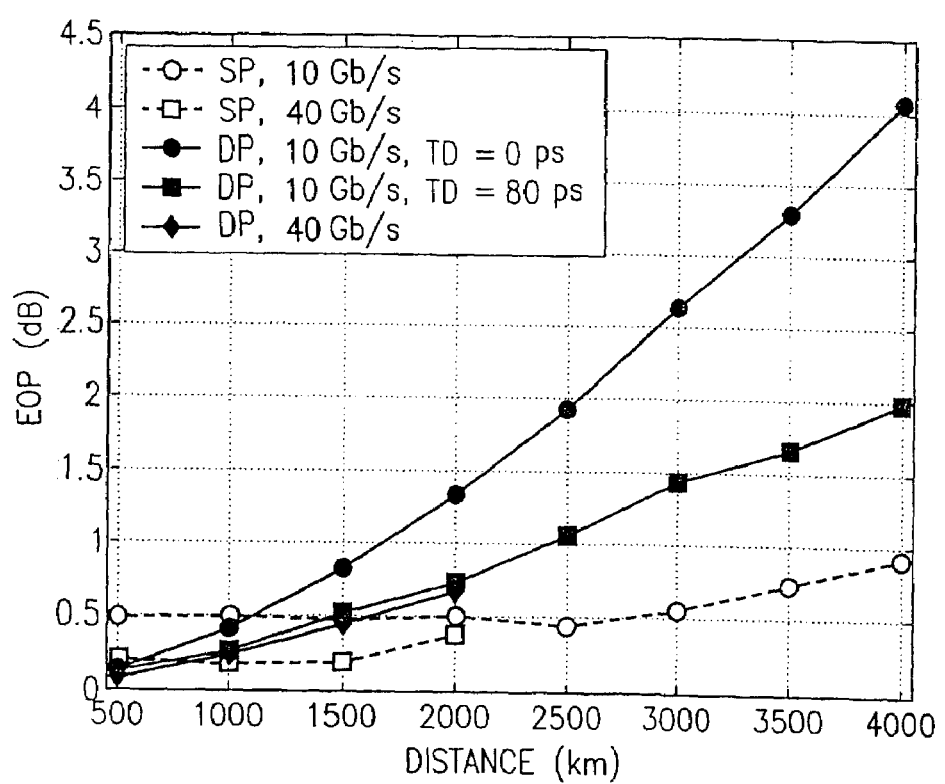
FIG. 7 is a plot showing the EOP versus transmission distances for 10-Gb/s and 40-Gb/s signals for different dispersion maps and time delays.

FIG. 7 shows the EOP versus transmission distances of 10-Gb/s and 40-Gb/s signals for different dispersion map schemes (where SP refers to a singly periodic dispersion map; DP refers to a doubly periodic dispersion map; and TD refers to time delay). It can be understood from FIG. 7 that while a singly periodic map can achieve the best performance, as discussed above, such maps require widely tunable dispersion compensators at the receiver side to bring NRD to zero at different locations for 40-Gb/s channels. (For the example in FIG. 7, −250 ps/nm and 200 ps/nm post-dispersion compensation for receivers at 500 km and 2000 km, respectively, was needed for transmission using a singly periodic map).

If a doubly periodic dispersion map is used and no time delay is introduced between odd and even channels, the inter-channel XPM is very serious for 10 Gb/s channels (EOP is about 4 dB at 4000 km). By using a dispersion map according to the invention with, for example, a desired amount of time delay between odd and even channels at each ROADM, we can suppress the inter-channel XPM of 10-Gb/s channels by about half. Moreover, by using a dispersion map according to the invention, the same pre- and post-dispersion compensations can be used for both 10-Gb/s and 40-Gb/s channels at all locations in the network (e.g. −300 ps/nm pre-dispersion compensation and 300 ps/nm post-dispersion compensation resulting in zero NRD).

It will also be appreciated by those skilled in the art that changes could be made to the embodiments described above without departing from the broad inventive concepts thereof. It is understood, therefore, that the present invention is not limited to the particular embodiments disclosed, but it is intended to cover modifications within the spirit and scope of the present invention as defined by the appended claims.

I claim:

1. A reconfigurable optical add-drop multiplexer (ROADM) apparatus for use in a hybrid data rate optical mesh network comprising:
    a dispersion compensator for fully compensating the residual dispersion of a fiber link in the network;
    a de-interleaver coupled to the dispersion compensator for de-interleaving odd and even channels of wavelength division multiplexed (WDM) signals transmitted across the fiber link; and
    a delay device coupled to the de-interleaver for introducing a delay to the odd channels or the even channels of the WDM signals to decorrelate the odd and even channels to substantially reduce inter-channel cross-phase modulation.

2. The apparatus according to claim 1, wherein the dispersion compensator comprises dispersion compensating fiber.

3. The apparatus according to claim 1, wherein the delay device comprises a fiber jumper of a predetermined length for introducing a desired delay.

4. An optical mesh network comprising:
    a plurality of reconfigurable optical add-drop multiplexers (ROADMs), each including:
        a dispersion compensator for fully compensating the residual dispersion of a fiber link in the network;
        a de-interleaver coupled to the dispersion compensator for de-interleaving odd and even channels of a wavelength division multiplexed (WDM) signal; and
        a delay device coupled to the de-interleaver for introducing a delay to the odd channels or the even channels of the WDM signal to decorrelate the odd and even channels to substantially reduce inter-channel cross-phase modulation.

5. A method for dispersion management in a hybrid data rate optical mesh network comprising the steps of:
    fully compensating the residual dispersion of a fiber link (RDPL) at at least one node in the network;
    de-interleaving odd and even channels of a wavelength division multiplexed (WDM) signal; and
    introducing a delay between odd and even channels of the WDM signal to decorrelate odd and even channels to substantially reduce inter-channel cross-phase modulation.

* * * * *